United States Patent [19]

Rubey

[11] 4,393,895

[45] Jul. 19, 1983

[54] CHECK VALVE FOR USE WITH HIGH PRESSURE PUMP

[75] Inventor: Robert J. Rubey, Wisconsin Rapids, Wis.

[73] Assignee: Sterling Drug Inc., New York, N.Y.

[21] Appl. No.: 263,506

[22] Filed: May 14, 1981

[51] Int. Cl.³ .............................................. F16K 15/04
[52] U.S. Cl. ............................ 137/539.5; 137/DIG. 3
[58] Field of Search ...................... 137/514, 539.5, 540, 137/543.19, DIG. 3

[56] References Cited

U.S. PATENT DOCUMENTS

| | | | |
|---|---|---|---|
| 1,642,724 | 9/1927 | Fleming | 137/454.4 |
| 1,877,938 | 9/1932 | Moore | 137/539.5 |
| 2,081,462 | 5/1937 | McClure | 137/533.11 X |
| 2,097,629 | 11/1937 | Lowrey | 137/539.5 X |
| 2,470,372 | 5/1949 | Roth | 137/539.5 |
| 2,481,713 | 9/1949 | Bertea | 137/539.5 X |
| 2,964,310 | 12/1960 | Stahlhuth | 137/539.5 X |
| 3,559,678 | 2/1971 | Donner | 137/539.5 X |

FOREIGN PATENT DOCUMENTS

| | | | |
|---|---|---|---|
| 2213104 | 10/1972 | Fed. Rep. of Germany | 137/539.5 |
| 262167 | 11/1926 | United Kingdom | 137/539.5 |

OTHER PUBLICATIONS

Statement re Chronological Development of Invention, by Allen H. Erickson, w/Bulletin by A. C. Horn and M. E. Zoborowski (Zimpro), mentioned in Section IV of Statement, and prints of FIGS. 1, 2 & 5 mentioned in Section II.

Primary Examiner—Robert G. Nilson
Attorney, Agent, or Firm—Wenderoth, Lind & Ponack

[57] ABSTRACT

A check valve for use with a high pressure sludge pump in which a valve member such as a ball is movable toward and away from a valve seat in the inlet to the valve housing, and which valve has a valve member lift limiter adjustably mounted on the valve body and extending into the path of movement of the valve member for engaging it and limiting movement of the valve member away from the valve seat, a plunger mounted for movement toward and away from the valve seat in the position closest to the valve seat, projecting past the valve member lift limiter toward the valve seat and having the end toward the valve member spaced from the valve member and permitting movement of the plunger away from the valve seat sufficiently far to permit the valve member to engage the valve lift limiter.

2 Claims, 7 Drawing Figures

CHECK VALVE FOR USE WITH HIGH PRESSURE PUMP

This invention relates to a check valve, and more particularly to a check valve for use with a high pressure slurry pump.

BACKGROUND OF THE INVENTION AND PRIOR ART

Check valves are a necessary component of high pressure positive displacement pumps, in particular pumps commonly known as plunger pumps, piston pumps and hydraulic exchange pumps, all of which have one or more chambers which alternately fill and discharge in a cyclical sequence. These pumps generally have 2-6 individual pumping units the cycles of which are staggered to more nearly approximate an even flow. The number of strokes or cycles per minute for each valve generally ranges from 2-15 for hydraulic exchange pumps and 30-300 for piston pumps and plunger pumps.

As fluid, pressurized by a piston, plunger or a pressure vessel enters the check valve, its flow rate rapidly increases to a maximum and then falls to zero and remains there until completion of the cycle. While the flow rate of plunger pumps and piston pumps when plotted against time generally follows a sinusoidal curve, the flow rate of a hydraulic exchange pump remains nearly constant at the maximum rate over much of the discharge portion of the pumping cycle. While water hammer and associated problems occur to some extent with piston pumps and plunger pumps, the phenomenon may be more severe with hydraulic exchange pumps because of the very rapid falloff in flow at the end of the discharge portion of the cycles, which results in seating of the ball with extreme inertia. The balls and seats tend to deteriorate nearly as rapidly as those of piston pumps for example, in spite of the slower speed (longer cycle time). In some applications, the noise generated by such a large high pressure pump may be a problem.

These types of pumps are typically used to pump slurries which are very erosive, for example, coal slurries, ore suspensions, or sludges containing sand and grit, at pressures of 50 to 3500 psig. Such materials may damage the ball and valve seat as the ball rapidly drops from the maximum flow position of the valve seat. This effect is magnified when the ball becomes seated in the same position on each stroke or cycle, i.e. without turning to produce wear evenly over its entire surface.

When the flow of fluid to a check valve is quickly stopped, as in these types of pumps, the ball does not seat immediately due to its inertia. The resulting blackflow or slip of the fluid tends to reduce the net pumping rate and pump efficiency.

The prior art is replete with check valves for many purposes, and many such valves provide an element for engaging the valve element of a check valve and controlling the movement of the valve element as it moves away from the valve seat and then against a valve lift limiter under the pressure of the fluid being handled by the valve. Examples of such patents are U.S. Pat. Nos. 1,877,938; 2,097,629; 2,481,713; 2,964,310; and 3,559,678.

It is also known to provide a cage around a valve in such a valve element for closely guiding the valve element in its movement from the position where it is seated on the valve seat to the position where it engages the valve lift limiter, see for example U.S. Pat. Nos. 1,642,724 and 2,081,462.

However, these valves do not overcome the above described problems. In all of these valves, especially those where the element actually engages the valve element at all times, the tendency is for the valve element to seat on the valve seat with the same part of the valve element contacting the valve seat each time the valve element seats. While this does not cause any great difficulty in valves which do not encounter very severe conditions during their use, it does cause undue wear on the valve elements of valves which are used under very severe conditions such as described above.

It would be desirable for the art to have a check valve in which the valve element is free to move each time it is shifted away from the valve seat so that wear is distributed over the whole valve element, yet in which the movement of the valve element is controlled during most of its movement away from the valve seat. It would further be desirable for the art to have such a valve which could be provided by making a simple change in an existing valve structure.

OBJECTS AND BRIEF SUMMARY OF THE INVENTION

It is accordingly the main object of the present invention to provide a check valve for use under severe conditions, such as in the handling of sludge or slurry from a high pressure pump, in which the wear on the valve element is distributed over the whole of the valve element.

It is a further object of the invention to provide such a valve in which the valve element is controlled during substantially all of its movement toward and away from the valve seat.

It is a still further object of the present invention to provide such a valve which can be made by replacing a part in an existing conventional valve.

It is another object of the present invention to provide such a valve which has other features which make it particularly suitable for use in controlling fluid pumped by a high pressure sludge pump.

To this end, the present invention provides a check valve in which a valve member such as a ball is movable toward and away from a valve seat in the inlet to the valve housing, and which valve has a member lift limiter adjustably mounted on the valve body and extending into the path of movement of the valve member for engaging it and limiting movement of the valve member away from the valve seat, a plunger mounted for movement toward and away from the valve seat and in the position closest to the valve seat, projecting past the valve member lift limiter toward the valve seat and having the end toward the valve member spaced from the valve member, and a spring urging the plunger toward the valve member and permitting movement of the plunger away from the valve seat sufficiently far to permit the valve member to engage the valve member lift limiter.

BRIEF DESCRIPTION OF THE DRAWINGS

The invention will now be described in greater detail in connection with the accompanying drawings, in which.

DETAILED DESCRIPTION OF THE INVENTION

Figure 1:
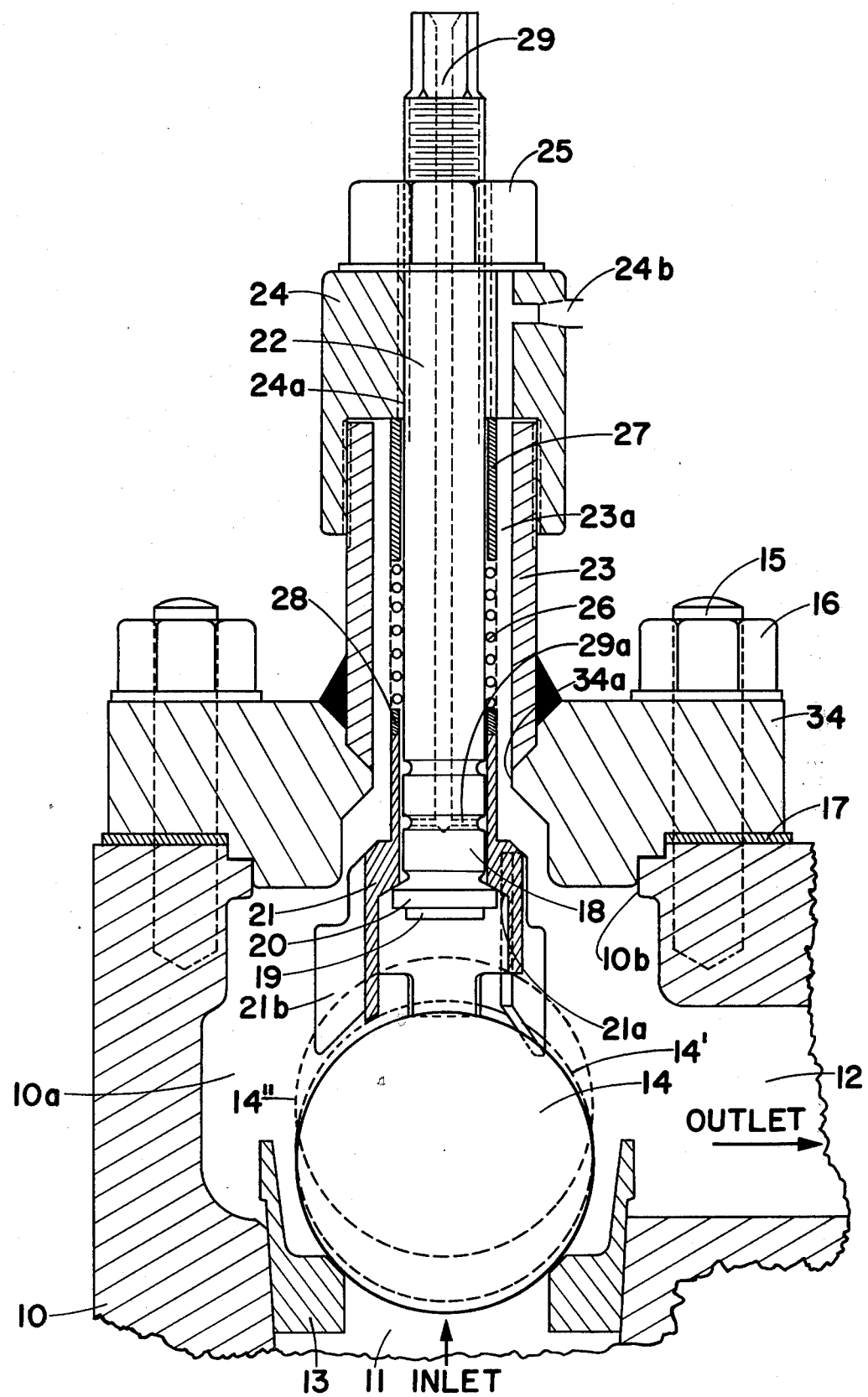
FIG. 1 is a vertical sectional view of the check valve for use with a high pressure pump, showing a first embodiment of the invention.

The embodiment of the check valve of the present invention as shown in FIG. 1 comprises a valve body 10 having an inlet 11 extending into the body 10 from below, and a laterally extending outlet 12. The space 10a between the inlet 11 and outlet 12 constitutes a fluid passageway extending through the valve body. Mounted in the valve inlet is a valve seat 13 against which seats a valve member 14, which is here shown in the shape of a ball. This valve member 14 is movable in the space 10a in a direction toward the valve inlet 11 for seating against the valve seat 13 for sealing the space 10a against the backflow of liquid material therethrough.

The check valve, which is specifically for use with a high pressure pump, is connected to the inlet and/or to the outlet of the fluid pumping chamber (not shown). Most of such pumps require two check valves for each pumping chamber, one each on the chamber inlet and chamber outlet.

The valve body has an aperture 10b therein opposite the inlet 11, and this is closed by a valve cover 34 which is secured by nuts 16 and studs 15. A seal 17 is provided between the cover and the surface of the valve body around the opening 10b.

For controlling the movement of the valve member 14 toward and away from the valve seat 13 in the space 10a, there is provided a valve member lift limiter, generally shown at 18. The lift limiter has the lower end 19 positioned within the space 10a in the path of the movement of the valve member 14 at a position for stopping movement of the valve member 14 away from the valve seat 13 at the desired position.

The lift limiter 18 has a shoulder 20 on the lower end thereof, and a stem 22 extending upwardly therefrom through an aperture 34a in the cover 34. Mounted on the cover 34 over the aperture 34a is a lift limiter housing 23 which surrounds the stem, and which has a lift limiter cap 24 threaded onto the upper end thereof in fluid tight engagement therewith. The upper end of the limiter stem 22 is threaded through a bore 24a in the cap 24, and a locking nut 25 is threaded onto the upper end of the stem 22 into engagement with the top of the lift limiter cap 24 for fixing the vertical position of the limiter stem 22.

A plunger 21 is slidably mounted on the lower portion of the stem 22, and has an internal shoulder 21a thereon which, in the lowermost position of the plunger 21, engages the shoulder 20 on the lower end of the lift limiter stem 22. In this position, a plurality of vanes 21b spaced around the periphery of the lower end of the plunger 21 project downwardly beyond the lower end 19 of the valve member lift limiter 18 to a point at which they approach to within 1 to 10 mm, and preferably 1.5 to 5 mm, of the ball 14 when the ball 14 is seated against the valve seat 13. The number of vanes shown is three in the present embodiment, but obviously a larger number could be used.

A coil spring 26 is positioned around the lift limiter stem 22 above the upper end of the plunger 21, and a spring abutment spacer 27 is positioned between the upper end of the coil spring and the lower side of the lift limiter cap 24. If desired, a collar 28 may be provided between the lower end of the spring and the upper end of the plunger. In its least stressed condition, the spring urges the spring loaded plunger 21 downwardly into the space 10a so that the internal shoulder 21a engages the shoulder 20.

An optional grease fitting 24b is provided in the peripheral wall of the cap 24, opening into the space 23a between the lift limiter housing 23 and the exterior of the spring 26 and spacer 27 and collar 28. This is for supplying grease to the space 23a so that sludge or slurry from the space 10 cannot rise into the space and foul the spring.

A flushing bore 29 is provided axially to the lift limiter stem 22, and has branches 29a opening laterally near the lower end of the stem 22. The upper end of the bore 29 normally is sealed with a metal plug during pump operation.

In operation, when sludge or slurry is pumped into the inlet 11 from the pump, the pressure causes the ball 14 to rise from the seat 13, thereby allowing sludge or slurry to pass the ball. After the ball 14 has contacted vanes 21b as shown by dotted line position 14′, further upward movement of the ball, such as to dotted line position 14″ is controlled by the reaction of the plunger 21 against the force of the spring 26, until the periphery of the ball engages the lower end 19 of the valve member lift limiter. At this point, the movement of the ball away from the valve seat 13 is blocked.

The vertical position of the lift limiter 18 can be adjusted by rotating the lift limiter stem 22 within the threaded bore 24a in the cap 24 and then adjusting the position of nut 25 to engage cap 24 to hold the stem 22 in its adjusted position. The upper end of the lift limiter stem 22 is preferably hexagonal in shape for engagement by a wrench or the like for purposes of rotating the stem 22.

Should it be necessary to flush the space 10a within the valve body 10, a high pressure source of fluid can be connected to the bore 29 in the stem 22 and the fluid will flow laterally through the lateral bores 29a and into the space 23a between the plunger 21 and the stem 22, and escape from there past the lower portion of the coil spring 26, and between the internal shoulder 21a and the shoulder 20. From there it will fill the space 10 for flushing the valve body.

Figure 2:
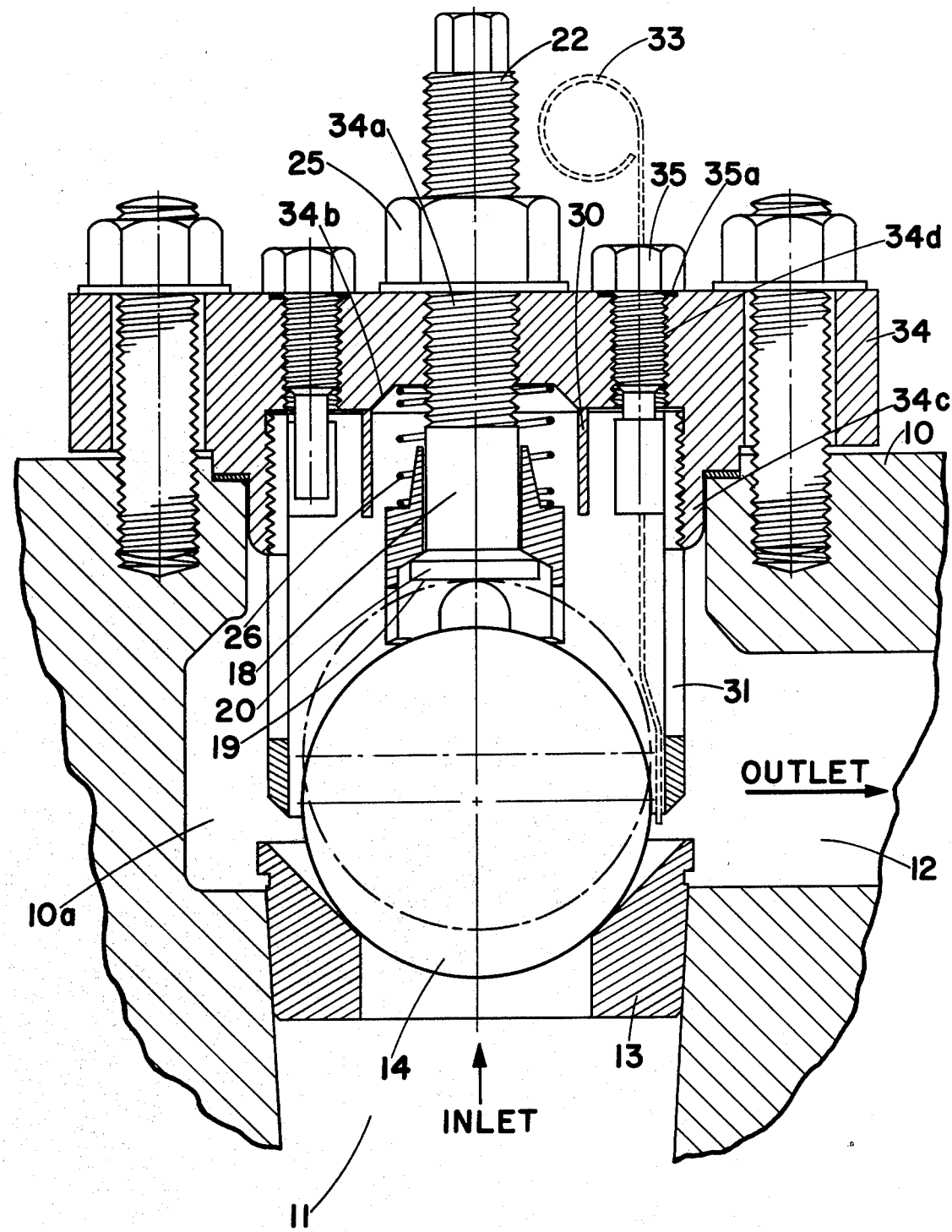
FIG. 2 is a vertical sectional view of a second embodiment of the check valve according to the invention.

The embodiment shown in FIG. 2 differs somewhat from that of FIG. 1 in that there is no lift limiter housing. In this Figure, the same reference numerals designate parts corresponding to those in FIG. 1.

It will be seen that the valve housing 10 has the valve inlet 11 and the valve outlet 12 and the space 10a the same as in the embodiment of FIG. 1. The valve seat 13 is basically the same as the valve seat 13 in the embodiment of FIG. 1, and the valve member is shown as a ball 14.

The lift limiter 18 has the shoulder 20 on the lower end 19 the same as the embodiment of FIG. 1, but the upper end is threaded directly into the aperture 34a of the cover 34, and the locking nut 25 is threaded on the upper end of the stem and engages directly with the top of the cover 34.

The spring 26 is somewhat shorter than the spring shown in the embodiment of FIG. 1, and extends into a slight spring retaining recess 34b in the inner side of the cover 34 for holding the upper end of the spring in position around the stem 22.

The embodiment of FIG. 2 further has an optional spring shroud 30 mounted on the underside of the cover 34 and extending downwardly around the spring 26. In addition, the embodiment of FIG. 2 has an apertured valve member guide or cage 31 threaded onto an internally threaded projection 34c on the underside of the cover 34 or otherwise connected to the cover 34 and projecting downwardly around the valve member 14. This guide 31 has the inner surface spaced somewhat from the the valve member 14 and serves to guide the valve member 14 loosely in its movement toward and away from the valve seat 13.

The cover 34 further has a plurality of clearance check tool apertures 34d therein spaced around the periphery of the cover 34 substantially in alignment with the periphery of the valve member 14, which apertures are provided for insertion of a clearance check guide 33 therethrough. This clearance check guide is for the purpose of checking the clearance between the valve member 14 and structure in the body 10, such as the guide 31. Bolts 35 are provided for closing the apertures 34d, gaskets 35a being provided under the heads of the bolts 35 if needed.

The operation of the check valve as shown in FIG. 2 is the same as that shown in FIG. 1.

The foregoing embodiments of the check valve are incorporated into positive displacement pumps which pump slurries and sludges, such as sewage sludges, industrial wastes, ore suspensions and coal slurries at high pressure, i.e. 50 to 3500 psig.

Figure 3:
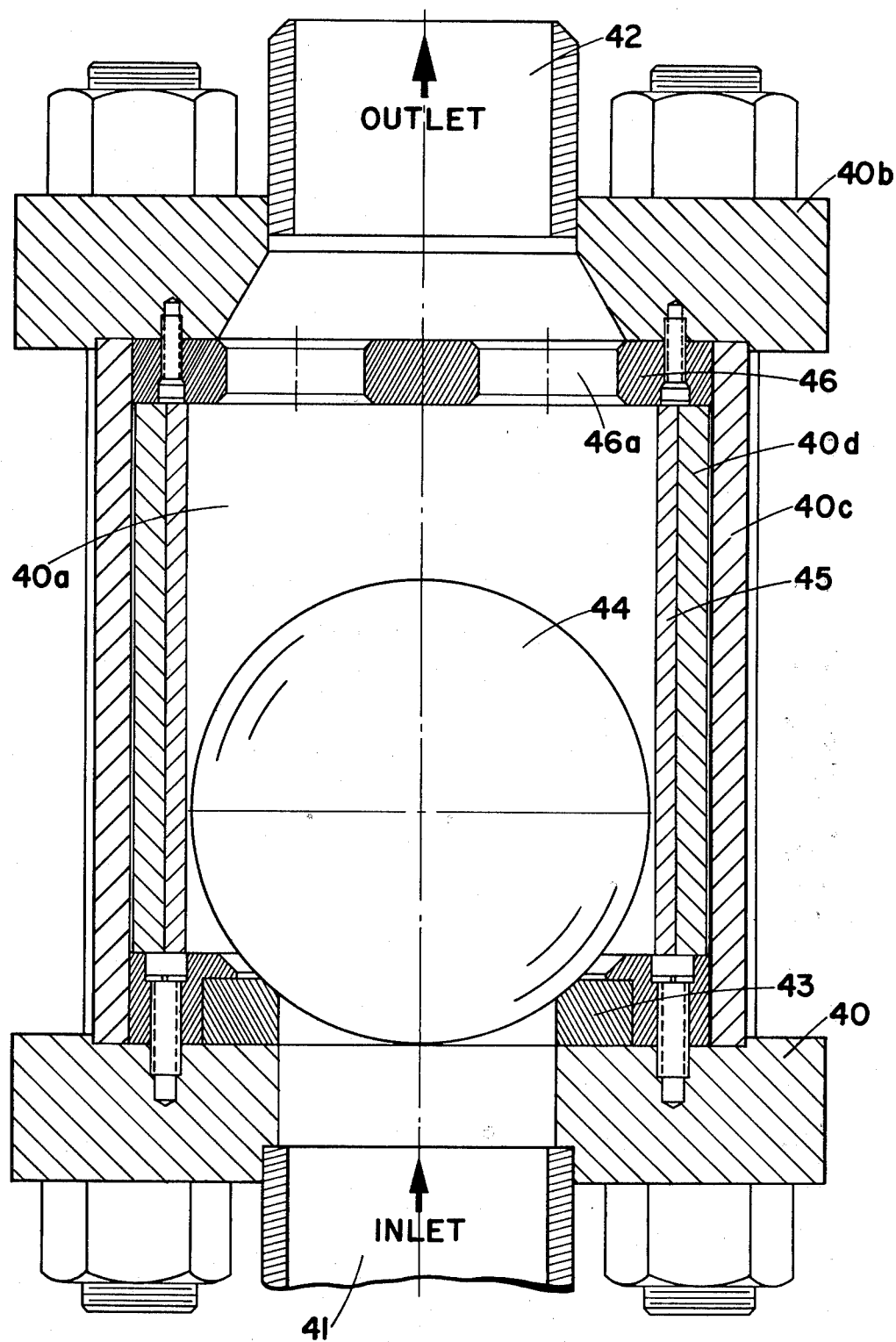
FIG. 3 is a vertical sectional view of a conventional check valve for use with a high pressure pump.

However, it is desirable to have a unit which can replace an existing piece of a conventional check valve such as shown in FIG. 3. In the prior art check valve of FIG. 3, there are lower and upper valve flanges 40 and 40b, with an inlet 41 and outlet 42 which are in alignment with each other. Held tightly between said flanges is the cylindrical valve body 40c, which encloses a liner 40d. A valve seat 43 is provided around the inlet 41, and a valve member 44, comprising a ball, is contained within the valve body 40c. The ball moves toward and away from the valve seat 43. The ball is guided by three or more guides 45 which are ribs extending parallel to the direction of fluid flow through the check valve and attached to the liner 40d. These guides occupy a relatively small portion of the peripheral space between ball 44 and liner 40d in order that fluid flow through the valve is not unduly limited thereby.

A plate member 46 is provided on the downstream side of ball 44, extending across the passage 40a through the valve 40c. This plate has apertures 46a therein through which the fluid being pumped can pass after it has passed around the ball 44. The plate 46 serves to limit the movement of the ball 44 in the direction away from the valve seat 43.

Figure 4:
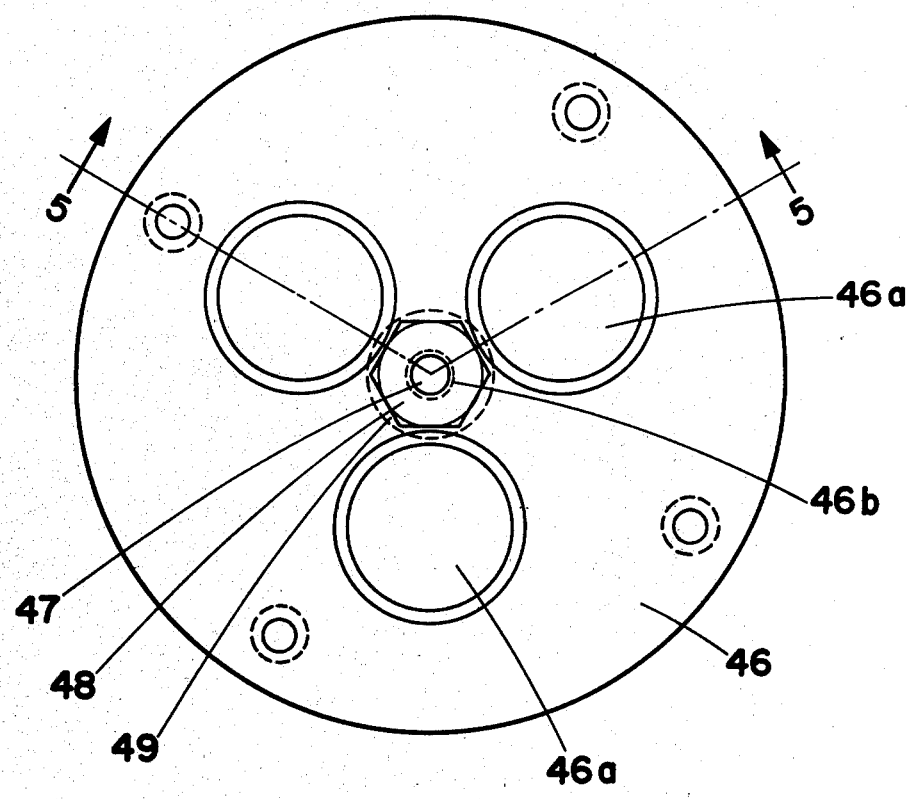
FIG. 4 is a plan view of a structure for replacement of a valve member limiter in the prior art structure of FIG. 3.
Figure 4B:
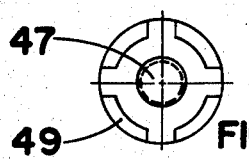
FIGS. 4A and 4B are sectional and plan views, respectively, of a plunger for use in the replacement structure of FIG. 4.
Figure 4A:
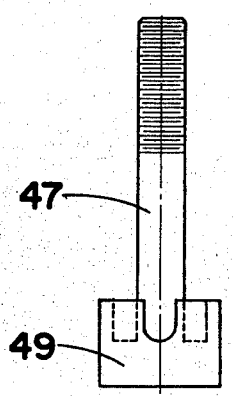
Figure 5:
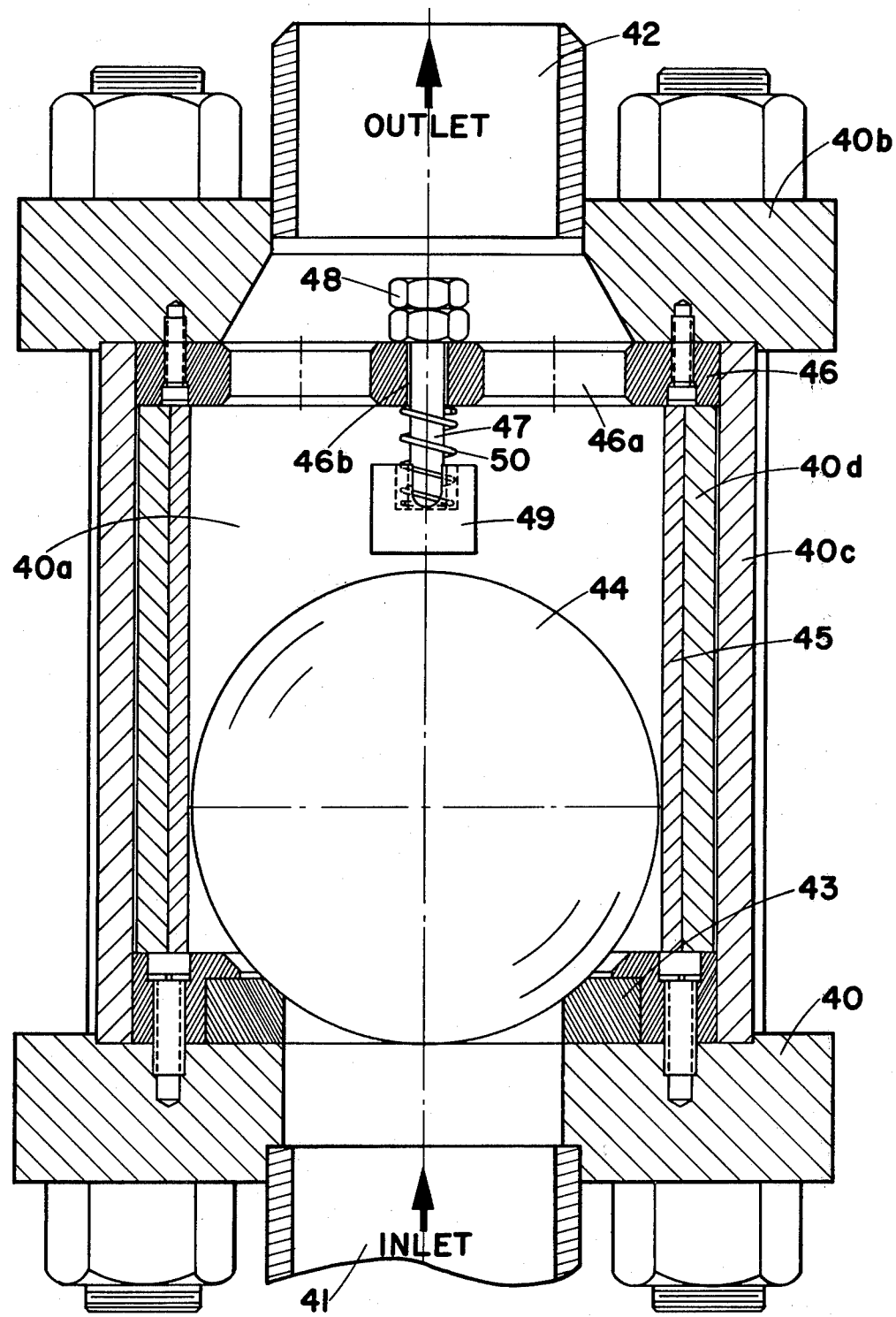
FIG. 5 is a sectional view taken along 5—5 of FIG. 4.

The embodiment of FIG. 4 is a replacement unit for the plate 46 shown in FIG. 3. This embodiment is shown in a complete valve assembly in FIG. 5, where the cross-sectional view is on line 5—5 of the plan view in FIG. 4. The valve plate 46 is provided with a central aperture 46b through which is slidably mounted a plunger stem 47 having a plunger 49 on the lower end of plunger stem 47 below the plate 46, the plunger 49 here being shown as integral with the stem. Securing nuts 48 are threaded on the upper end of the stem 47 for adjustably setting the maximum downward extension of the plunger stem 47 and plunger 49. A coil spring 50 is provided between the plunger 49 and the lower side of plate 46. The position of the plunger 49 is adjusted by nuts 48 so that when the ball 44 is fully seated, plunger 49 is extended downward under the action of coil spring 50 to a point 1 to 10 mm from said ball. The preferred position is 1.5 to 5 mm from the ball. Free rotational movement of the ball 44 as it moves upward toward plunger 49 is thus encouraged, resulting in even wearing of the ball surface to extend its useful life.

When the ball 44 is moved away from the valve seat 43 under the pressure of the fluid passing through the check valve it engages the plunger 49 which moves upwardly against the force of the coil spring until the upper side of the plunger engages the lower surface of the plate 46, at which point the plunger will move upward no further. At this point, the ball 44 is blocked against further upward movement by plunger 49 which thereby also acts as a ball lift limiter.

As the flow through the valve decreases, the action of the coil spring 50 moves the plunger 49 and ball 44 downward toward the valve seat 43, to a point where the ball is 1–10 mm from the valve seat. At the instant when pressure is released, or reverse pressure occurs, the ball 44 need move only 1–10 mm to be fully seated. Seating of the ball occurs more quickly and with less momentum, so as to:

a. reduce or eliminate backflow;
b. reduce or eliminate waterhammer resulting from ball and fluid movement;
c. reduce wear on ball 44 and valve seat 43; and
d. extend check valve life.

In each of the three embodiments of the invention, because the plunger is limited in its movement toward the valve seat so that it is spaced from the valve member when the valve member is seated on the seat, there is a short time during the time the valve member leaves the seat before it contacts the plunger so that its further movement away from the valve seat is controlled. During this short time, the valve member is free to change its position, i.e. in the case of the ball-shaped valve member 14 or 44 to rotate, so that it is not always seated on the valve seat in the same position. This feature distributes the wear over the whole valve member, making it unnecessary to replace it as frequently as if it were always under the control of the plunger and was seated on the valve seat in the same position each time the valve closes.

In the embodiments of FIGS. 1 and 2, the specific structure for keeping the plunger spaced from the valve member is the opposed shoulders on the plunger and the valve member lift limiter.

The embodiment of FIG. 1 further has the lift limiter housing 23 extending upwardly from the cover in which the spring 26 is provided, and the space within this housing around the spring can be filled with grease through fitting 24b to prevent corrosion or fouling of the spring. The valve of this embodiment further has means to flush this space and the valve housing in the form of the flushing bore 29.

The embodiment of FIG. 2 is somewhat simplified in that the housing is omitted, the stem 22 being threadedly mounted directly on the cover 34. However, the spring 26 is optionally protected by the shroud 30.

Moreover, the apertures 34*d* are provided for insertion of the clearance check guide 33 to check the clearance between the valve member 14 and the valve member guide 31.

By provision of one or more of these features, a sturdy and long lasting valve is provided which is capable of withstanding the difficult conditions encountered in handling sludges and slurries.

While this valve is very useful for direct attachment to high pressure pumps, its use is not limited thereto. It may be used generally in any pipeline to control pulsating fluid flow.

What is claimed is:

1. A check valve member for use with a high pressure pump, said valve comprising:
    a valve body having an inlet and an outlet and a fluid passageway therebetween;
    a valve seat in said passageway between said inlet and said outlet;
    a valve member comprising a ball in said passageway movable toward said valve inlet for seating against said valve seat for sealing said passageway against backflow of fluid therethrough;
    a plate extending across the outlet end of said valve body and having one or more apertures therein for passage of fluid therethrough;
    a plunger slidably mounted on said plate for movement toward and away from said valve seat coaxially with the axis of said valve body and in the position closest to said valve seat projecting to within 1 to 10 mm of the valve member when said valve member is seated on said valve seat and in the position furthest from said valve seat acting as a valve member lift limiter;
    spring means urging said plunger toward and into contact with said valve member and permitting movement of said plunger away from said valve seat sufficiently far to permit said valve member to attain a maximum lift position; and
    adjusting means mounted on said plunger and operably associated with said plate for adjusting the position of said plunger toward and away from said valve seat.

2. A check valve as claimed in claim 1, in which said plunger when it is in the position closest to said valve seat projects to within 1.5 to 5 mm of the seated valve member.

* * * * *